(12) United States Patent  
Leach et al.

(10) Patent No.: US 8,898,381 B2  
(45) Date of Patent: Nov. 25, 2014

(54) RAID STORAGE SYSTEMS HAVING ARRAYS OF SOLID-STATE DRIVES AND METHODS OF OPERATION

(75) Inventors: Anthony Leach, Stockport (GB); Franz Michael Schuette, Colorado Springs, CO (US)

(73) Assignee: OCZ Storage Solutions Inc., San Jose, CA (US)

( * ) Notice: Subject to any disclaimer, the term of this patent is extended or adjusted under 35 U.S.C. 154(b) by 956 days.

(21) Appl. No.: 12/960,626

(22) Filed: Dec. 6, 2010

(65) Prior Publication Data

US 2011/0138113 A1    Jun. 9, 2011

Related U.S. Application Data

(60) Provisional application No. 61/267,473, filed on Dec. 8, 2009.

(51) Int. Cl.
*G06F 12/00* (2006.01)
*G06F 11/10* (2006.01)

(52) U.S. Cl.
CPC .......... *G06F 11/1008* (2013.01); *G06F 11/108* (2013.01)
USPC ............ 711/114; 711/100; 711/113; 711/154

(58) Field of Classification Search
CPC ....... G06F 3/06; G06F 12/00; G06F 12/0607; G06F 12/0851

USPC .................. 711/100, 113, 114, 127, 154, 157
See application file for complete search history.

(56) References Cited

U.S. PATENT DOCUMENTS

| | | | | |
|---|---|---|---|---|
| RE34,100 E | * | 10/1992 | Hartness | 714/769 |
| 5,586,248 A | * | 12/1996 | Alexander et al. | 714/22 |
| 5,856,989 A | * | 1/1999 | Oldfield et al. | 714/801 |
| 6,557,123 B1 | * | 4/2003 | Wiencko et al. | 714/701 |
| 6,880,047 B2 | * | 4/2005 | Spencer | 711/142 |
| 2010/0079885 A1 | * | 4/2010 | McKean | 360/15 |

* cited by examiner

*Primary Examiner* — Tuan Thai
(74) *Attorney, Agent, or Firm* — Hartman Global IP Law; Gary M. Hartman; Michael D. Winter

(57) ABSTRACT

RAID storage systems and methods adapted to enable the use of NAND flash-based solid-state drives. The RAID storage system includes an array of solid-state drives and a controller operating to combine the solid-state drives into a logical unit. The controller utilizes data striping to form data stripe sets comprising data (stripe) blocks that are written to individual drives of the array, utilizes distributed parity to write parity data of the data stripe sets to individual drives of the array, and writes the data blocks and the parity data to different individual drives of the array. The RAID storage system detects the number of data blocks of at least one of the data stripe sets and then, depending on the number of data blocks detected, may invert bit values of the parity data or add a dummy data value of "1" to the parity value.

13 Claims, 3 Drawing Sheets

(a)

| A | B | XOR |
|---|---|-----|
| 0 | 0 | 0 |
| 0 | 1 | 1 |
| 1 | 0 | 1 |
| 1 | 1 | 0 |

(b)

| A | B | C | XOR |
|---|---|---|-----|
| 0 | 0 | 0 | 0 |
| 0 | 0 | 1 | 1 |
| 0 | 1 | 0 | 1 |
| 0 | 1 | 1 | 0 |
| 1 | 0 | 0 | 1 |
| 1 | 0 | 1 | 0 |
| 1 | 1 | 0 | 0 |
| 1 | 1 | 1 | 1 |

| A | B | XOR/1 |
|---|---|---|
| 0 | 0 | 1 |
| 0 | 1 | 0 |
| 1 | 0 | 0 |
| 1 | 1 | <u>1</u> |

| A | B | DUMMY | XOR/1 |
|---|---|---|---|
| 0 | 0 | 1 | 1 |
| 0 | 1 | 1 | 0 |
| 1 | 0 | 1 | 0 |
| 1 | 1 | 1 | <u>1</u> |

RAID STORAGE SYSTEMS HAVING ARRAYS OF SOLID-STATE DRIVES AND METHODS OF OPERATION

CROSS REFERENCE TO RELATED APPLICATIONS

This application claims the benefit of U.S. Provisional Application No. 61/267,473, filed Dec. 8, 2010, the contents of which are incorporated herein by reference.

BACKGROUND OF THE INVENTION

The present invention generally relates to memory devices for use with computers and other processing apparatuses. More particularly, this invention relates to the use of solid-state drives in combination with redundant arrays of independent drives (RAID) configurations.

Mass storage devices such as advanced technology attachment (ATA) drives and small computer system interface (SCSI) drives are rapidly adopting non-volatile memory technology, such as flash memory or another emerging solid-state memory technology including phase change memory (PCM), resistive random access memory (RRAM), magnetoresistive random access memory (MRAM), ferromagnetic random access memory (FRAM), organic memories, or nanotechnology-based storage media such as carbon nanofiber/nanotube-based substrates. Currently the most common solid-state technology uses NAND flash memory components as inexpensive storage memory, often in a form commonly referred to as a solid-state drive (SSD).

Briefly, flash memory components store information in an array of floating-gate transistors, referred to as cells. The cell of a NAND flash memory component has a top gate (TG) and a floating gate (FG), the latter being sandwiched between the top gate and the channel of the cell. The floating gate is separated from the channel by a layer of tunnel oxide. Data are stored in (written to) a NAND flash cell in the form of a charge on the floating gate which, in turn, defines the channel properties of the NAND flash cell by either augmenting or opposing a charge on the top gate. This charge on the floating gate is achieved by applying a programming voltage to the top gate. Data are erased from a NAND flash cell by applying an erase voltage to the device substrate, which then pulls electrons from the floating gate. The charging (programming) of the floating gate is unidirectional, that is, programming can only inject electrons into the floating gate, but not release them.

NAND flash cells are organized in what are commonly referred to as pages, which in turn are organized in what are referred to as memory blocks (or sectors). Each block is a predetermined section of the NAND flash memory component. A NAND flash memory component allows data to be stored, retrieved and erased on a block-by-block basis. For example, erasing cells is described above as involving the application of a positive voltage to the device substrate, which does not allow isolation of individual cells or even pages, but must be done on a per block basis. As a result, the minimum erasable size is an entire block, and erasing must be done every time a cell is being re-written.

In stand-alone drives, the above-noted "pre-erase requirement" of the NAND data structure can cause performance degradation. However, with the use of house-keeping functions, such as coalescing and pro-actively erasing blocks containing old or obsolete data (garbage collection) and subsequent reclaiming of the blocks through TRIM functionality, a reasonable status quo can be maintained over most of the life span of a drive. In this context, it is important to note that as many blocks as possible have to be in the "erased state" in order to allow fast write access.

The "pre-erase requirement" of the NAND data structure poses an impediment to the use of NAND flash memory components in redundant arrays of independent drives (or devices), commonly referred to as RAID. A typical implementation of RAID technology employs a RAID controller for combining an array of disk drives into a logical unit where all drives in the array are interdependent. Most implementations of RAID technology employ data striping, which is a known technique for segmenting logically sequential data when storing data to different physical storage devices. The most prevalent forms of true RAID (not counting RAID Level 0 or Level 1) are RAID Level 5 and RAID Level 6. RAID Level 5 typically uses Hamming code based on XOR calculations to generate the checksum of corresponding bit values across the array. In contrast to, for example, RAID Level 4, which uses the same principle and stores the parity data on a dedicated drive, RAID Level 5 uses distributed parity, meaning that the parity values are stored in blocks across all drives belonging to the array using a rotating scheme. As an example, a Level 5 RAID configuration is represented in FIG. 1 as using three data blocks and one parity block for each set of stored data, resulting in four drives (devices).

As known in the art, parity calculations using the XOR operator are widely used to provide fault tolerance in a given set of data. These calculations can be carried out at the system level with a central processing unit (CPU) of a host computer, or by a dedicated microprocessor. As represented in FIG. 2(a), the result of performing the XOR calculation on two different bit values (0 and 1, or 1 and 0) is 1, whereas the result is 0 for two identical bit values (1's or 0's). By extension, any even number of identical bit values (1 or 0) will result in a parity value of 0. In the case of hard disk drives or volatile memory systems (such as SDRAM), this particular feature has no bearing on functionality. However, in the context of NAND-based solid-state drives, and in particular because of their unidirectional programming mode of operation, the XOR result can pose a severe problem. As represented in FIG. 2(b), if a RAID Level 5 configuration contains an even number of drives, then the parity calculation is carried out across an odd number of blocks belonging to a stripe. In contrast, FIG. 2(a) evidences that the parity calculation is carried out across an even number of blocks belonging to a stripe if the RAID Level 5 configuration contains an odd number of drives. For a RAID Level 5 configuration containing NAND flash-based solid-state drives, if a drive erases or else writes "1's" to all bits, the corresponding parity block is programmed as all "0's." Because of their unidirectional programming mode, NAND flash-based drives do not allow any further update of the block without selectively erasing the particular block on the drive having the parity data for a given stripe. The same problem occurs in all cases where partial pages are being written, in that typically the part of the page that is "not written to" is programmed to all "1's" or FF byte values. Consequently, the parity block will have all corresponding entries programmed to "0." If the unused part of the page is updated on any block, the parity block must also be updated. However, this is not possible unless the entire data set is moved to a fresh block, starting from "FF" values.

The situation described above can cause an excessive number of unnecessary program/erase cycles for blocks used for parity values. Aside from slowing down the write speed, the result can be excessive wear on these drives. Particularly in the case of data updates, the stripe block allocation across the different devices in the array may not change. Therefore, the drive holding the respective parity data will be rewritten with new parity data to new blocks, leaving all previously used blocks programmed to "00," which constitutes the worst case scenario for wear, programming and erase time.

In view of the problem outlined above, RAID Level 5 and also RAID Level 6 (dual distributed parity) are effectively crippled in terms of implementation with NAND-based solid-state drives. Therefore, new strategies are needed to adapt these and other RAID configurations using parity calculations for use with NAND flash-based solid-state drives, as well as any other solid-state storage media with similar behavioral characteristics.

BRIEF SUMMARY OF THE INVENTION

The present invention discloses RAID storage systems and methods adapted to enable the use of NAND flash-based solid-state drives.

According to one aspect of the invention, a RAID storage system is provided that includes an array of solid-state drives and a controller operating to combine the array of solid-state drives into a logical unit. Furthermore, the controller utilizes data striping to segment data to form data stripe sets comprising data (stripe) blocks that are written to individual drives of the array of solid-state drives, utilizes distributed parity to write parity data of the data stripe sets to individual drives of the array of solid-state drives, and writes the data blocks and the parity data to different individual drives of the array of solid-state drives. The RAID storage system further includes means for detecting the number of data blocks of at least one of the data stripe sets, and means for inverting bit values of the parity data depending on the number of data blocks detected by the detecting means.

Another aspect of the invention is the controller of the RAID storage system described above, and particularly a controller that comprises the detecting and/or inverting means.

According to a third aspect of the invention, a method is provided for operating a RAID storage system comprising an array of solid-state drives and a controller operating to combine the array of solid-state drives into a logical unit, utilize data striping to segment data to form data stripe sets comprising data (stripe) blocks that are written to individual drives of the array of solid-state drives, utilize distributed parity to write parity data of the data stripe sets to individual drives of the array of solid-state drives, and write the data blocks and the parity data to different individual drives of the array of solid-state drives. The method includes detecting the number of data blocks of at least one of the data stripe sets, calculating the parity data corresponding to the data blocks for each data stripe set, and either writing the calculated parity data to a parity block on an individual drive of the array of solid-state drives if the number of detected data blocks is odd, or inverting bit values of the calculated parity data to yield inverted parity data that are then written to a parity block on an individual drive of the array of solid-state drives if the number of detected data blocks is even.

Other aspects of the invention include RAID storage systems and methods that make use of dummy bit values instead of inverting bit values of parity data. Such a RAID storage system includes an array of solid-state drives and a controller operating to combine the array of solid-state drives into a logical unit. The controller utilizes data striping to segment data to form data stripe sets comprising data (stripe) blocks that are written to individual drives of the array of solid-state drives, utilizes distributed parity to write parity data of the data stripe sets to individual drives of the array of solid-state drives, and writes the data blocks and the parity data to different individual drives of the array of solid-state drives. The RAID storage system further includes means for detecting the number of data blocks of at least one of the data stripe sets, and means for calculating the parity data corresponding to the data blocks for each data stripe set by adding a dummy bit value to the parity data if the number of data blocks detected by the detecting means is an even number.

A method that makes use of dummy bit values entails operating a RAID storage system comprising an array of solid-state drives and a controller operating to combine the array of solid-state drives into a logical unit, utilize data striping to segment data to form data (stripe) stripe sets comprising data blocks that are written to individual drives of the array of solid-state drives, utilize distributed parity to write parity data of the data stripe sets to individual drives of the array of solid-state drives, and write the data blocks and the parity data to different individual drives of the array of solid-state drives. The method further includes detecting the number of data blocks of at least one of the data stripe sets, and then calculating the parity data corresponding to the data blocks for each data stripe set by adding a dummy bit value to the parity data if the number of data blocks detected by the detecting means is an even number.

A technical effect of the invention is the ability of a RAID storage system to be aware of the number of devices within its array of storage devices and then, based on whether the number of drives that are part of the data striping is even or odd, match the erased/partially-written/fully-programmed status of stripe blocks with the same status of the parity block(s). As such, the invention is capable of adapting RAID configurations using parity calculations for use with NAND flash-based solid-state drives, as well as other solid-state storage media with similar behavioral characteristics.

Other aspects and advantages of the invention will be better appreciated from the following detailed description.

BRIEF DESCRIPTION OF THE DRAWINGS

FIG. 2 shows truth tables of parity calculations for (a) odd and (b) even numbers of devices as used in a RAID Level 5 configuration of the prior art.

DETAILED DESCRIPTION OF THE INVENTION

Figure 1:
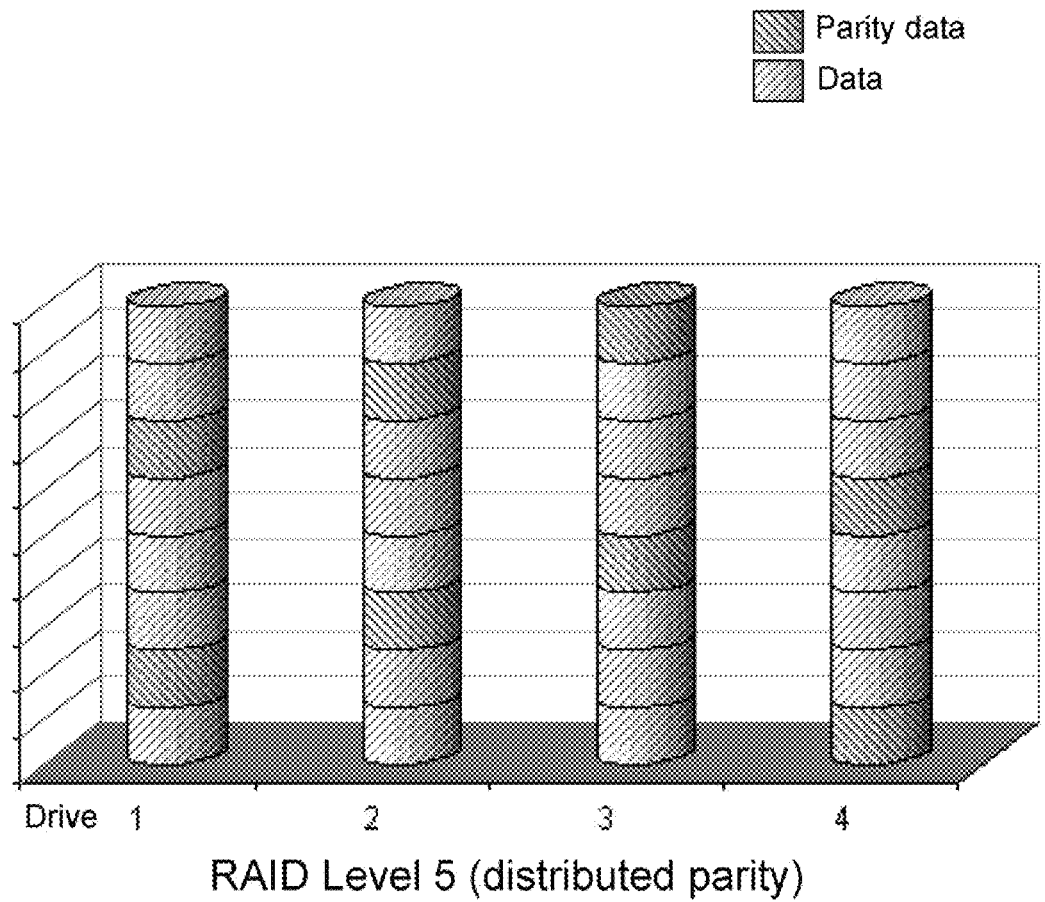
FIG. 1 represents a Level 5 RAID configuration containing four drives (devices), in which case three data blocks and one parity block are used for each set of stored data.

The current invention is directed to solving problems that can arise when attempting to use NAND flash-based solid-state drives (or any other solid-state storage media with similar behavioral characteristics) in a RAID storage system using parity calculations, which may be carried out by a dedicated microprocessor, or at the system level such as with the central processing unit (CPU) of a host computer. Similar to prior art implementations of RAID technologies, RAID storage systems employed with the present invention preferably employ an array of memory drives (devices) and a RAID controller that combines the array of drives into a logical unit and utilizes data striping to segment data stored on the drives, as represented in FIG. 1. RAID Level 5 configurations are of particular interest to the present invention, though the invention is applicable to other RAID configurations that use data striping with parity and write the data and parity values to different drives. Examples include RAID Level 6 configurations, characterized by two parity blocks that allow for multiple drive failure redundancy, and RAID Level 4 configurations characterized by a dedicated parity drive.

As previously described in reference to FIG. 2, a particular issue arises with RAID configurations using an even number of data stripe sets as a result of employing an odd number of drives (devices). In this case, the erasing of blocks or partial page writes using FF values for the "un-used" part of the page will cause the parity values for the corresponding redundancy stripes to be 00. In the case of a NAND flash-based solid-state drives (devices), this means that the respective cells in the redundancy blocks are at their "fullest" programmed values and cannot be programmed to any other values without undergoing a complete block erase first. As previously noted, this situation can lead to excessive and unnecessary program/erase cycles for blocks used for parity values and, aside from slowing down the write speed, will also cause excessive wear on these drives. A similar situation could occur in the case of an "erase" or any other procedure that writes FF values to a drive as a prerequisite for subsequent programmability. If the controller is applying RAID policies to the drive preparation, which, in the case of software utilities is a likely scenario, then it will leave the parity blocks programmed to "00" which means they are completely unusable unless they are erased first. Also in the case of software-based drive management, for example, garbage collection, TRIM and erase, execution of these maintenance routines will leave the "parity" blocks at FF byte values rather than fully programmed to 00 values.

Figure 3:
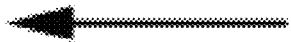
FIG. 3 shows a truth table of parity calculations for an odd number of devices similar to the truth table of FIG. 2(a), but with inversion of the parity data in accordance with an embodiment of the present invention.

In accordance with an embodiment of the present invention, a method for circumventing the above-noted problem is to be aware of the number of data (stripe) blocks of the sets of data stripes being allocated and written across the individual drives of the array. For example, the number of drives within the drive array of a RAID storage system can be detected. If the number of drives minus parity allocations is odd (corresponding to the number of data blocks of each data stripe set), then there is no need to change anything. However, if the number of drives minus parity allocations is even, the present invention provides for inverting the parity values, meaning that a 0 becomes a 1 and vice-versa. FIG. 3 represents the result of such an operation performed with the example of FIG. 2(a) for a RAID configuration containing an odd number of drives, which after accounting for parity allocations results in the parity calculation being carried out across an even number of blocks belonging to a data stripe. As a result of inverting the parity values, the respective cells can be immediately reprogrammed to a "lower value." In this case, a partial page write, with the "unused" part of the page programmed to "1" will also result in a parity value of "1" being written to the parity sector. As such, the status (erased, partially-written, or fully-programmed) of the data blocks of a given data stripe can be matched with the same status of the parity block of the data stripe, reducing the number of program/erase cycles performed on the parity block that would lead to excessive and premature wear of the drives.

Inversion of the parity values can be done by performing a simple subtraction operation, where the inverted parity value (Pi) is 1 minus the parity result (Pr):

$$Pi = 1 - Pr.$$

Both the detection of the number of drives (or otherwise the number of data blocks of each data stripe set) and the inversion of parity values can be performed at the system level with the RAID controller of the RAID storage system. Alternatively, it is foreseeable that parity values could be inverted using separate inversion circuitry, as well known in the art. As nonlimiting examples, parity inversion could be performed with a separate dedicated microprocessor or software, or simply a latch that inverts the parity value. Such operations are routinely performed in, for example, dynamic bus inversion, and therefore will not be discussed in any detail here.

Figure 4:
FIG. 4 shows a truth table of parity calculations for an even number of devices similar to the truth table of FIG. 3, but with the addition of a dummy value of 1 to the data set for parity calculation in accordance with an embodiment of the present invention.

Another method for circumventing the problem of implementing RAID configurations involving distributed parity with NAND-based solid-state drives is represented in FIG. 4 as the addition of a "dummy" data value (for example, 1) as part of a virtual drive for every bit for which the parity is calculated. In effect, a RAID configuration containing an odd number of devices (similar to FIG. 3) appears to contain an even number of devices for purposes of the parity calculation. As such, similar to the previously described approach of FIG. 3, implementing the approach of FIG. 4 also involves detecting the number of data blocks of the data stripe sets, for example, be detecting the number of drives within the array of a RAID storage system and subtracting the number of drives for parity allocations. The parity data are then calculated for the data blocks of each data stripe set by adding a dummy bit value to the parity data if the number of data blocks detected by the detecting means is an even number.

While the invention has been described in terms of specific embodiments, it is apparent that other forms could be adopted by one skilled in the art. For example, the invention could be implemented with RAID configurations other than Levels 5 and 6, and implemented with solid-state memory components other than NAND flash memory devices. Furthermore, it is foreseeable that the memory devices could be physical and/or logical drives, as is known with commercially available RAID storage systems. Therefore, the scope of the invention is to be limited only by the following claims.

The invention claimed is:

1. A RAID storage system comprising:
an array of solid-state drives;
a controller operating to combine the array of solid-state drives into a logical unit, utilize data striping to segment data to form data stripe sets comprising data blocks that are written to individual drives of the array of solid-state drives, utilize distributed parity to write parity data of the data stripe sets to individual drives of the array of solid-state drives, and write the data blocks and the parity data to different individual drives of the array of solid-state drives;
means for detecting the number of data blocks of at least one of the data stripe sets; and
means for inverting bit values of the parity data depending on the number of data blocks detected by the detecting means.

2. The RAID storage system of claim 1, wherein the array of solid-state drives comprises physical or logical drives.

3. The RAID storage system of claim 1, wherein the array of solid-state drives comprises NAND-based solid-state drives.

4. The RAID storage system of claim 1, wherein the parity data are calculated with parity calculations carried out at a system level of the RAID storage system.

5. The RAID storage system of claim 1, wherein the parity data are calculated with parity calculations carried out by a dedicated microprocessor within the RAID storage system.

6. The RAID storage system of claim 1, wherein the inverting means comprises software operating within the RAID storage system.

7. The RAID storage system of claim 1, wherein the inverting means comprises a dedicated inversion circuitry within the RAID storage system.

8. The RAID storage system of claim 1, wherein the controller comprises the means for detecting the number of data blocks of at least one of the data stripe sets.

9. The RAID storage system of claim 1, wherein the controller comprises the means for inverting bit values of the parity data depending on the number of data blocks detected by the detecting means.

10. The RAID storage system of claim 1, wherein the controller comprises the means for detecting the number of data blocks of at least one of the data stripe sets and the means for inverting bit values of the parity data depending on the number of data blocks detected by the detecting means.

11. A controller for use in a RAID storage system, the RAID storage system comprising an array of solid-state drives, the controller comprising:
    software or circuitry configured to operate to combine the array of solid-state drives into a logical unit, utilize data striping to segment data to form data stripe sets comprising data blocks that are written to individual drives of the array of solid-state drives, utilize distributed parity to write parity data of the data stripe sets to individual drives of the array of solid-state drives, and write the data blocks and the parity data to different individual drives of the array of solid-state drives; and
    means for detecting the number of data blocks of at least one of the data stripe sets,
    wherein the RAID storage system comprises means for inverting bit values of the parity data depending on the number of data blocks detected by the detecting means.

12. A controller for use in a RAID storage system, the RAID storage system comprising an array of solid-state drives, the controller comprising:
    software or circuitry configured to operate to combine the array of solid-state drives into a logical unit, utilize data striping to segment data to form data stripe sets comprising data blocks that are written to individual drives of the array of solid-state drives, utilize distributed parity to write parity data of the data stripe sets to individual drives of the array of solid-state drives, and write the data blocks and the parity data to different individual drives of the array of solid-state drives, wherein the RAID storage system comprises means for detecting the number of data blocks of at least one of the data stripe sets; and
    means for inverting bit values of the parity data depending on the number of data blocks detected by the detecting means.

13. A controller for use in a RAID storage system, the RAID storage system comprising an array of solid-state drives, the controller comprising:
    software or circuitry configured to operate to combine the array of solid-state drives into a logical unit, utilize data striping to segment data to form data stripe sets comprising data blocks that are written to individual drives of the array of solid-state drives, utilize distributed parity to write parity data of the data stripe sets to individual drives of the array of solid-state drives, and write the data blocks and the parity data to different individual drives of the array of solid-state drives;
    means for detecting the number of data blocks of at least one of the data stripe sets; and
    means for inverting bit values of the parity data depending on the number of data blocks detected by the detecting means.

* * * * *